United States Patent
Alden et al.

(10) Patent No.: US 12,302,126 B2
(45) Date of Patent: *May 13, 2025

(54) SIGNAL DISTRIBUTION INTERFACE

(71) Applicant: Outdoor Wireless Networks LLC, Claremont, NC (US)

(72) Inventors: Sandra D. Alden, Bedford, VA (US); Van E. Hanson, Forest, VA (US); Michael J. Williamson, Clayton, NC (US)

(73) Assignee: Outdoor Wireless Networks LLC, Richardson, TX (US)

( * ) Notice: Subject to any disclaimer, the term of this patent is extended or adjusted under 35 U.S.C. 154(b) by 429 days.

This patent is subject to a terminal disclaimer.

(21) Appl. No.: 17/217,122

(22) Filed: Mar. 30, 2021

(65) Prior Publication Data

US 2021/0219150 A1    Jul. 15, 2021

Related U.S. Application Data

(63) Continuation of application No. 14/277,167, filed on May 14, 2014, now Pat. No. 11,425,579.
(Continued)

(51) Int. Cl.
*H04W 24/02* (2009.01)
*H04B 7/024* (2017.01)
*H04W 88/08* (2009.01)

(52) U.S. Cl.
CPC ............ *H04W 24/02* (2013.01); *H04B 7/024* (2013.01); *H04W 88/085* (2013.01)

(58) Field of Classification Search
USPC ....................................................... 715/736
See application file for complete search history.

(56) References Cited

U.S. PATENT DOCUMENTS 5,845,257 A   12/1998   Fu et al.
6,009,466 A   12/1999   Axberg et al.
(Continued)

FOREIGN PATENT DOCUMENTS

WO    2013033715 A2    3/2013

OTHER PUBLICATIONS

European Patent Office, "Communication under Rule 71(3) EPC from EP Application No. 14822182.3", from Foreign Counterpart to U.S. Appl. No. 14/277,167, Nov. 8, 2017, pp. 1 through 64, Published: EP.
(Continued)

*Primary Examiner* — William L Bashore
*Assistant Examiner* — Conrad R Pack
(74) *Attorney, Agent, or Firm* — Fogg & Powers LLC

(57) ABSTRACT

A telecommunications system including a processor and a non-transitory computer-readable medium storing a signal distribution engine is provided. The signal distribution engine is executable by the processor device to detect incoming signals received by a DAS that includes a headend unit coupled to RAU(s) using a communication cables or optical fiber; determine information about the detected signals; assign specified signals received by the DAS to a specified RAU in response to a user input via a signal distribution graphical user interface, which includes representations of and associations between the specified signals, headend unit, and RAU(s), that manually associates the specified signals with the specified remote antenna unit; and in response to the user input, output instructions regarding how to route the specified signals from the headend unit to the specified remote antenna unit over a communication cable or optical fiber communicatively coupled to the specified remote antenna unit.

18 Claims, 9 Drawing Sheets

Related U.S. Application Data

(60) Provisional application No. 61/844,057, filed on Jul. 9, 2013.

(56) References Cited

U.S. PATENT DOCUMENTS

| | | | |
|---|---|---|---|
| 6,224,549 | B1 | 5/2001 | Drongelen |
| 6,393,483 | B1 | 5/2002 | Latif et al. |
| 6,624,830 | B1 | 9/2003 | Beck et al. |
| 7,286,507 | B1 | 10/2007 | Oh et al. |
| 7,610,046 | B2 | 10/2009 | Wala |
| 7,693,974 | B2 | 4/2010 | Huang et al. |
| 7,848,747 | B2 | 12/2010 | Wala |
| 7,886,054 | B1 | 2/2011 | Nag et al. |
| 8,229,497 | B2 | 7/2012 | Scheinert |
| 8,270,387 | B2 | 9/2012 | Cannon et al. |
| 8,510,149 | B1* | 8/2013 | He .............. G06Q 10/00 705/7.26 |
| 8,762,510 | B2 | 6/2014 | Sabat, Jr. et al. |
| 8,948,155 | B2 | 2/2015 | Cannon et al. |
| 2002/0191565 | A1 | 12/2002 | Mani et al. |
| 2004/0186758 | A1 | 9/2004 | Halac et al. |
| 2005/0075544 | A1 | 4/2005 | Shapiro et al. |
| 2008/0026765 | A1* | 1/2008 | Charbonneau ........ H04W 16/20 455/446 |
| 2009/0005096 | A1 | 1/2009 | Scheinert |
| 2009/0102617 | A1 | 4/2009 | Thommes |
| 2010/0296816 | A1 | 11/2010 | Larsen |
| 2011/0009056 | A1 | 1/2011 | Hanson et al. |
| 2011/0201368 | A1 | 8/2011 | Faccin et al. |
| 2012/0134666 | A1 | 5/2012 | Casterline et al. |
| 2012/0134673 | A1* | 5/2012 | Palanisamy ...... H04B 10/25758 398/58 |
| 2012/0220333 | A1 | 8/2012 | Zhu |
| 2013/0017863 | A1 | 1/2013 | Kummetz et al. |
| 2013/0051278 | A1* | 2/2013 | Watkins ............ H04W 28/0247 370/254 |
| 2013/0071112 | A1* | 3/2013 | Melester ............. H04B 1/006 455/67.14 |
| 2013/0128760 | A1* | 5/2013 | Fujishima ............ H04W 72/04 370/252 |
| 2013/0295838 | A1* | 11/2013 | Arlotta .................. H04W 4/90 455/3.01 |
| 2014/0072064 | A1* | 3/2014 | Lemson .................. H04B 7/04 375/267 |
| 2015/0016441 | A1* | 1/2015 | Hanson ................ H04W 28/16 370/338 |
| 2015/0019979 | A1 | 1/2015 | Alden et al. |

OTHER PUBLICATIONS

European Patent Office, "Communication under Rule 71(3) from EP Application No. 18167619.8 mailed Apr. 15, 2019", from Foreign Counterpart to U.S. Appl. No. 14/277,167, pp. 1-36, Published: EP.

European Patent Office, "Extended European Search Report for EP Application No. 18167619.8 dated May 25, 2018", "Foreign Counterpart to U.S. Appl. No. 14/227,167", May 25, 2018, pp. 1-12, Published in: EP.

European Patent Office, "Extended European Search Report from EP Application No. 14822182.3", from Foreign Counterpart to U.S. Appl. No. 14/277,167, Feb. 3, 2017, pp. 1 through 10, Published: EP.

European Patent Office, "Extended European Search Report from EP Application No. 19199757.6", from Foreign Counterpart to U.S. Appl. No. 14/277,167, Jan. 27, 2020, pp. 1-10, Published: EP.

U.S. Patent and Trademark Office, "Office Action", U.S. Appl. No. 14/277,167, Jun. 8, 2016, pp. 1 through 28, Published: US.

International Searching Authority, "International Search Report and Written Opinion from PCT Application No. PCT/US2014/038041", from Foreign Counterpart to U.S. Appl. No. 14/277,167, Sep. 12, 2014, pp. 1 through 12, Published: WO.

U.S. Patent and Trademark Office, "Final Office Action", U.S. Appl. No. 14/277,167, May 8, 2017, pp. 1 through 34, Published: US.

U.S. Patent and Trademark Office, "Advisory Action", U.S. Appl. No. 14/277,167, Sep. 25, 2017, pp. 1 through 6, Published: US.

U.S. Patent and Trademark Office, "Advisory Action", U.S. Appl. No. 14/277,167, Jan. 6, 2020, pp. 1 through 4, Published: US.

U.S. Patent and Trademark Office, "Advisory Action", U.S. Appl. No. 14/277,167, Oct. 19, 2018, pp. 1 through 7, Published: US.

U.S. Patent and Trademark Office, "Examiner's Answer", U.S. Appl. No. 14/277,167, Aug. 3, 2020, pp. 1 through 12, Published: US.

U.S. Patent and Trademark Office, "Final Office Action", U.S. Appl. No. 14/277,167, Jun. 28, 2018, pp. 1 through 29, Published: US.

U.S. Patent and Trademark Office, "Final Office Action", U.S. Appl. No. 14/277,167, Sep. 6, 2019, pp. 1-38, Published: US.

U.S. Patent and Trademark Office, "Office Action", U.S. Appl. No. 14/277,167, Jan. 4, 2019, pp. 1 through 28, Published: US.

U.S. Patent and Trademark Office, "Office Action", U.S. Appl. No. 14/277,167, Jan. 10, 2018, pp. 1 through 33, Published: US.

U.S. Patent and Trademark Office, "Notice of Allowance", U.S. Appl. No. 14/277,167, Apr. 15, 2022, pp. 1 through 15, Published: US.

U.S. Patent and Trademark Office, "Decision on Appeal, Appeal 2021-000130, U.S. Appl. No. 14/277,167", Jan. 14, 2022, pp. 1 through 9, Published: US.

* cited by examiner

SIGNAL DISTRIBUTION INTERFACE

CROSS-REFERENCE TO RELATED APPLICATION

This application is a continuation of U.S. application Ser. No. 14/277,167, filed on May 14, 2014, and titled "Signal Distribution Interface," which claims priority to U.S. Provisional Application Ser. No. 61/844,057, filed Jul. 9, 2013, and titled "Signal Distribution Interface," the contents of both of which are incorporated herein by reference in their entirety.

BACKGROUND

A distributed antenna system ("DAS") may be used to extend the coverage of a telecommunications system. DAS's may include various components, such as central access nodes, expansion nodes, and universal access points. Configuration of a DAS can be challenging. Because distribution of signals through a DAS can be complex, the DAS is typically planned in advance of the installation of the system. After installation, configuring a DAS can be challenging.

SUMMARY

The subject matter described herein includes methods and systems for controlling signals in a distributed antenna system via a signal distribution interface.

According to one example, the system includes a processor device and a non-transitory computer-readable medium on which a signal distribution engine is stored and which is executable by the processor device. The system is configured to receive information about signals transported by the DAS and about hardware components of the distributed antenna system that include a headend component and a remote component. The system is further configured to generate a signal set assignment user interface that includes a representation of signals transported by the system and a representation of signal sets. Each signal set includes one or more of the signals transported by the system. The system is further configured to generate a signal distribution user interface that includes representations of signal sets, hardware components, and associations between the signal sets and the hardware components. Responsive to receiving a command via the signal distribution user interface to associate a signal set with a specified hardware component, the system is configured to output a command to cause the distributed antenna system to configure a signal path so that signals in the signal set are provided to the specified hardware component.

According to another example, a non-transitory computer-readable medium has computer-executable instructions that, when executed by a computer having a display, enable the computer to display a graphical user interface. The graphical user interface is configured to display a signal set assignment user interface including a list of signals transported by a distributed antenna system (DAS) and a list of editable signal sets. Each signal set includes one or more of the signals transported by the DAS. The graphical user interface is further configured to display a signal distribution user interface. The signal distribution user interface includes a first grouping of one or more widgets, a second grouping of one or more widgets, and a list of signal sets. In the first grouping, each widget represents a headend component of the DAS. The second grouping of one or more widgets represents one or more remote units in the DAS that are associated with the headend components of the first grouping. The list of signal sets represents groups of signals to be transported in the DAS.

The details of one or more aspects and examples are set forth in the accompanying drawings and the description below. Other features and aspects will become apparent from the description, the drawings, and the claims.

DETAILED DESCRIPTION

Certain aspects and features relate to a signal distribution interface usable for controlling signals in a distributed antenna system (DAS). The signal distribution interface can be a graphical user interface (GUI) by which the DAS can be configured and that provides a successful user experience from the perspective of the user with limited knowledge. The GUI can be generated by a computing device. The GUI may provide elements to allow a user to visualize a model of the system. The visual model of the DAS can allow the user to interact with the DAS hardware to plan the distribution of signal inputs to outputs. The signal distribution interface or GUI is made simple and intuitive by, for example, using visual cues and user action support to fill in gaps of a user's knowledge and provide guidance to facilitate the setup process. In response to inputs from a user received by the GUI, signal distribution in the DAS can be configured, changed, controlled, and established.

Figure 1:
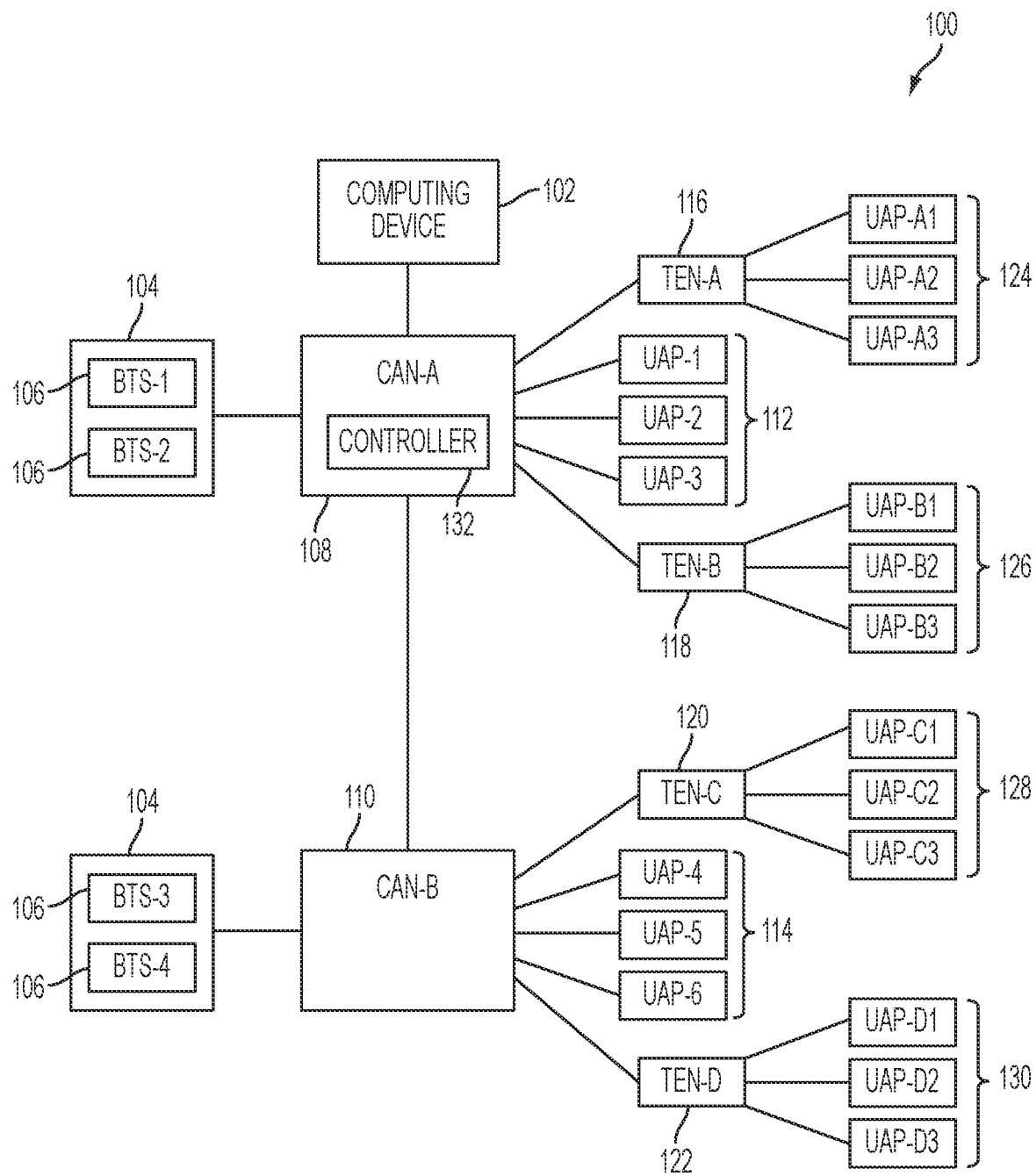
FIG. 1 is a block diagram depicting an example of a distributed antenna system according to one aspect of the present disclosure.

FIG. 1 is a block diagram of an example of a DAS 100 with a computing device 102 and communicatively coupled to signal sources 104, 106, such as base transceiver stations BTS-1, BTS-2, BTS-3, and BTS-4. The DAS 100 includes two central access nodes (CAN's) CAN-A 108, CAN-B 110 that are each a headend. The CAN's 108-110 can transceive signals between the signal sources 104 and universal access points (UAPs) directly or through expansion nodes over communication cables, optical fiber, or wirelessly. For example, CAN-A 108 can directly transceive signals with UAPs 112 and CAN-B 110 can directly transceive signals with UAPs 114. Alternatively, CAN-A 108 can indirectly transceive signals with UAPs 124 and 126 via transport expansion nodes (TENs), TEN-A 116 and TEN-B 118, respectively. CAN-B 110 can indirectly transceive signals with UAPs 128, 130 via TEN-C 120 and TEN-D 122, respectively. An example of a UAP includes a remote unit or a remote antenna unit. UAPs can each wirelessly communicate with mobile devices. In some aspects, UAPs may be positioned in a building or tunnel to extend wireless communication coverage.

A CAN may also route signals through other CANs to UAPs associated with the other CANs. For example, a signal from signal source BTS-1 associated with CAN-A 108 may be routed through CAN-B 110 to UAP-4 114. In some aspects, a separate switching and combining device (not shown) may be provided between a CAN and UAP and usable to interconnect the CAN and the UAP.

CAN-A 108 includes a controller 132 that can detect the existence of hardware, such as UAPs 112-114, 124-130, TENs 116-122, and other CANs 110 in the DAS 100 and certain information about the status of operation of the hardware. The controller 132 can be communicatively coupled to the computing device 102. The computing device 102 can receive information from the controller 132 and provide command signals to the controller 132 for controlling the distribution of signals between signal sources 104 and UAPs 112-114, 124-130. Information about signals transported by the DAS can be received from a source in the DAS or from a source outside of the DAS, such as a connected BTS. Information about signals transported by the DAS can be received either separately or in combination from the sources. For example, the controller 132 can respond to command signals from the computing device 102 by changing the UAPs 112-114, 124-130 that wirelessly transmit certain signals from a certain source 104 or 106.

Figure 2:
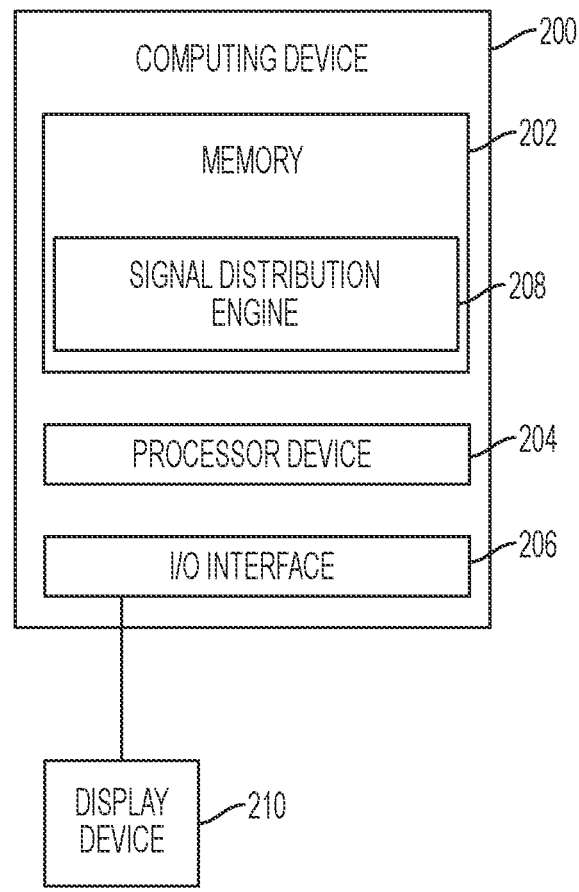
FIG. 2 is a block diagram depicting an example of a computing device according to one aspect of the present disclosure.

FIG. 2 depicts a block diagram of an example of the computing device 102. Examples of the computing device 102 can include a computer, a server, a laptop, a mobile device, and a tablet computer. The computing device 102 includes a memory 202, a processor device 204, and an input/output (I/O) interface 206. The memory 202 may be a non-transitory computer-readable medium that tangibly stores executable code, such as a signal distribution engine 208. The signal distribution engine 208, when executed by the processor device 204, can cause the computing device 102 to perform actions. Examples of actions include generating a GUI for display by the display device 210 and providing commands to the controller 132, through the I/O interface.

FIGS. 3-8 depict examples of screen faces that may be generated by the processor device 204 executing the signal distribution engine 208.

Figure 3:
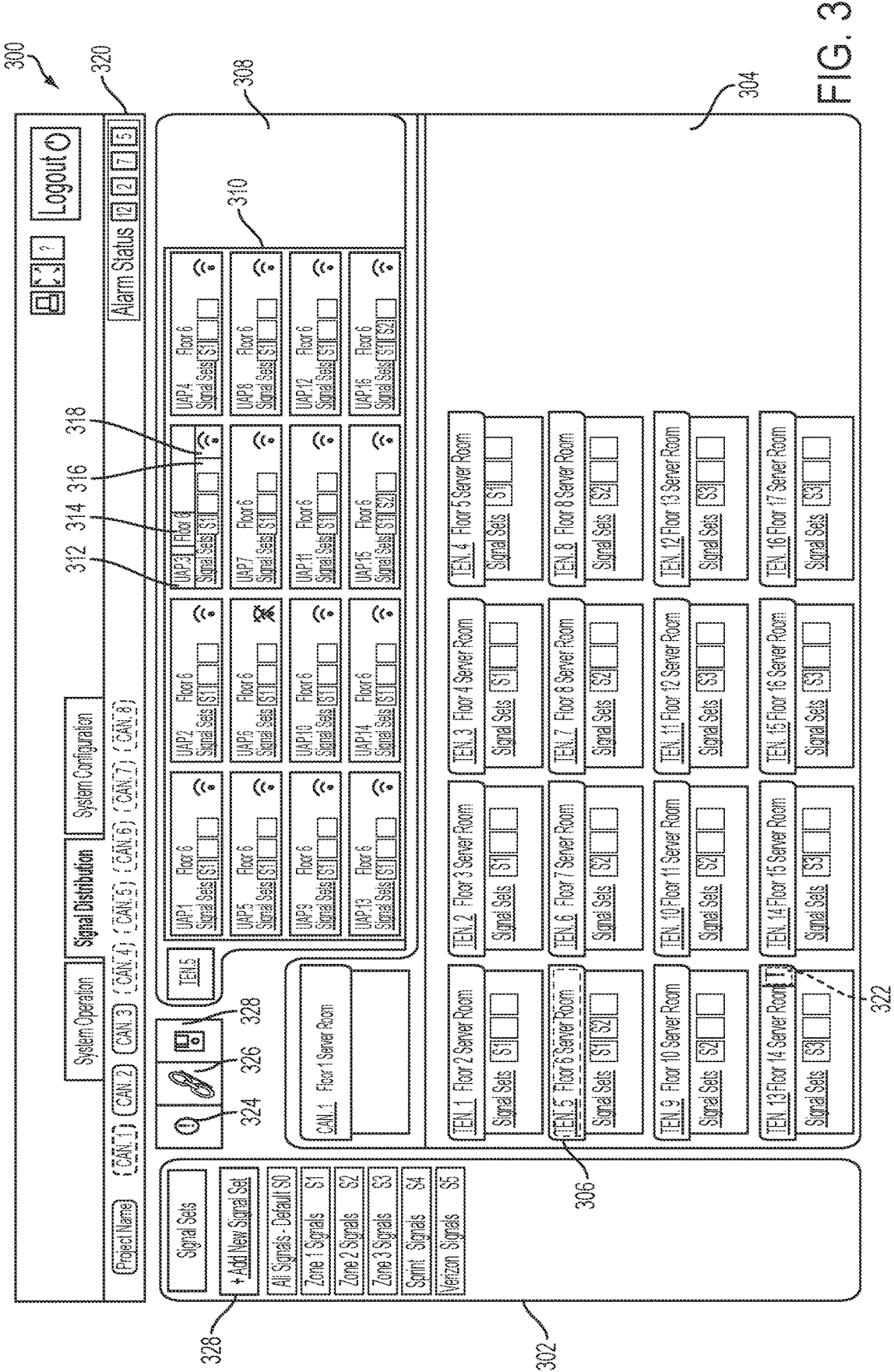
FIG. 3 depicts an example of a screen face of a landing page of a signal distribution user interface according to one aspect of the present disclosure.

FIG. 3 depicts an example of a landing page screen face 300 showing sets of signals 302 (e.g., S0 to S5) that can be associated with different hardware of a DAS. The same signal may be included in more than one signal set. The bottom portion 304 of the screen face 300 identifies the extension nodes (i.e., TENs) that are included in the DAS. In the example shown, TEN.5 is selected as illustrated by selection 306 and, once selected, UAPs associated with TEN.5 are displayed in the upper portion 308 of the screen face 300. Shown for each TEN and UAP is a freeform text description 314 that is the location of the TEN or UAP, but may include other information. Associated with each hardware component 312 (e.g., TEN and UAP) are the sets of signals 316 currently associated with the hardware component. In some aspects, a user can hover over a UAP using an input device, such as a mouse device, to receive freeform text information about the UAP. An indicator 318 associated with each UAP can indicate the condition of the UAP. Examples of indicators 318 can include: turned on and radiating signals (e.g., UAP.1 in the depicted example), connected but not radiating any signals (e.g., UAP.14 in the depicted example), and not radiating and associated with an alarm condition (e.g., UAP.6 in the depicted example). Alarm conditions and levels can also be represented on the screen face 300. For example, an alarm status 320 in the upper corner of the screen face 300 indicates different types of alarms and the number of alarms for each type. Also shown with respect to TEN.13 is an alarm indicator 322 representing that an alarm exists associated with TEN.13. Selecting the alarm indicator 322 may cause the computing device 102 to generate an alarm interface (not shown) through which a user can receive additional information about an alarm. The interface 300 also includes an "i-link" icon 324 that is selectable for displaying a help menu, a "link" icon 326 that is selectable for associating signal sets to hardware, and a "diskette" icon 328 that is selectable for saving signal set distribution changes.

As used herein, a "pane" can refer to a visual area within a user interface. A pane can have a rectangular or other two-dimensional shape and may or may not overlap with the area of other panes. A pane can display the output of, and allow input to, one or more computing processes. A pane can be displayed by a graphical display and can be manipulated with a pointer or other input device. Panes can be resized, moved, hidden, restored or closed. Panes can also include multiple graphical objects, such as a menu-bar, toolbar, controls, icons, and a working area. In the working area, a document, image, or other object can be displayed.

The signal distribution user interface shown in FIG. 3 can include multiple panes for displaying different types of information. Moreover, selecting items (e.g., representations of hardware components or signal sets) in a first pane can automatically change the information displayed in a second or third pane. The information displayed in the panes of the signal distribution user interface can be interrelated. A first list of signal sets transported by the system can be positioned in a first pane 302. A list of zones in the system and a second list of signals sets associated with each zone can be positioned in a second pane 304. At least one of the zones in the second pane can be selectable. For example, zone "Floor 6 Server Room" 306 is selected in FIG. 3. A list of remote units associated with a selected zone and a third list of signal sets associated with the selected zone can be positioned in a third pane 308. For example, the one or more UAPs associated with zone "Floor 6 Server Room" 306 and their associated signal sets can be displayed in third pane 308 in FIG. 3.

Figure 4:
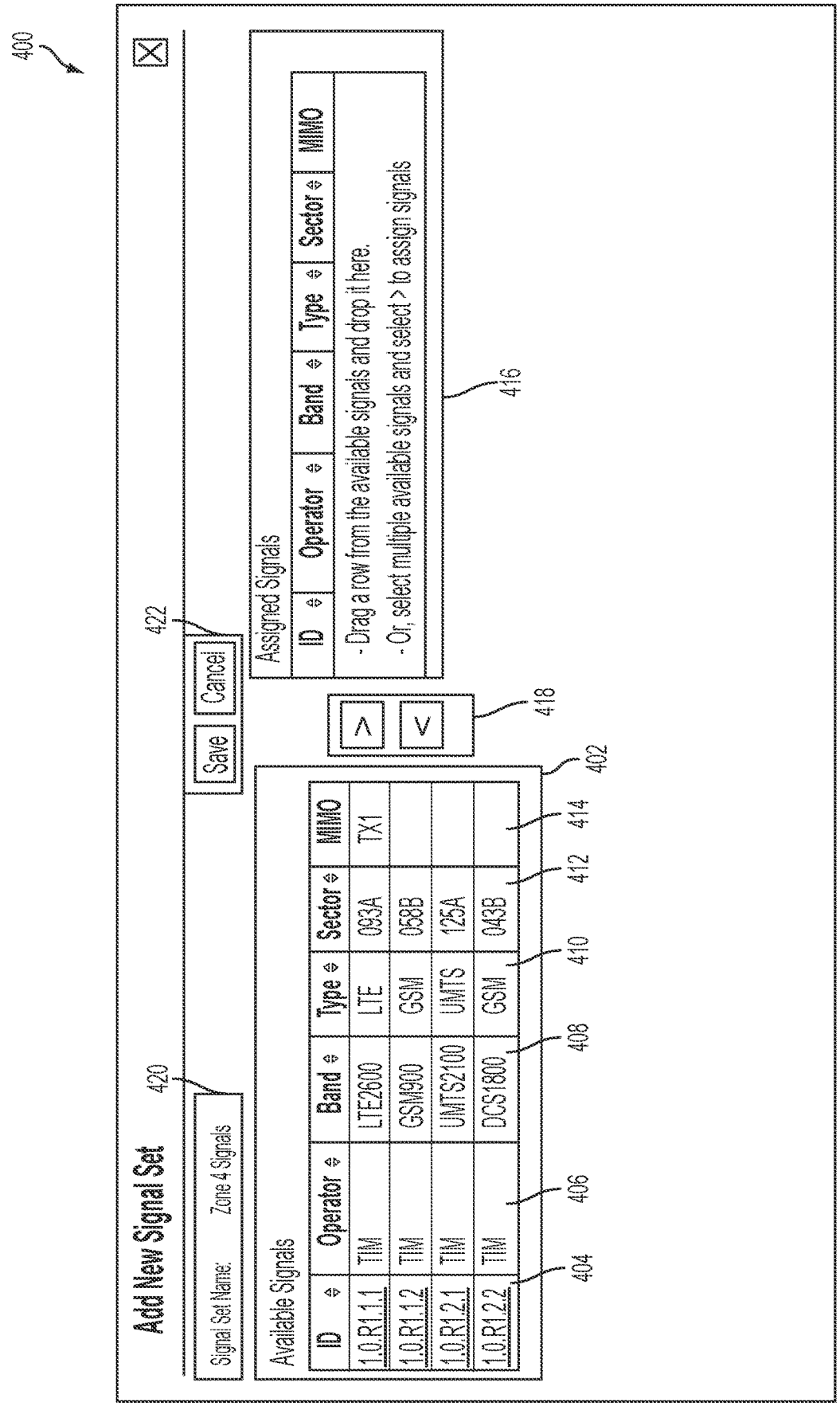
FIG. 4 depicts an example of a screen face of a signal set assignment user interface for assigning signals to signal sets according to one aspect of the present disclosure.

FIG. 4 is an example of a screen face by which a new signal set can be added. The screen face 400 can be accessed by selecting the "Add New Signal Set" option 238 on the screen face 300 of FIG. 3. FIG. 4 lists available signals 402 in the DAS 100 as detected by the controller 132. For each signal there is listed an identification 404, an operator 406, a band 408, a type 410, a sector 412, and MIMO information 414. A signal set can be created by selecting one or more signals from the list of available signals 402 and moving the signals using a mouse device, or otherwise, to the area corresponding to the assigned signal sets 416. For example, the user can drag the available signals and drop them into area 416 or can select one or more signals from the list of signals 402 and click arrows 418 to assign or unassign signals. A signal set name can be inputted in box 420 and the signal set saved using save interface 422, after which the signal set can appear above the list of signals 402 available for being assigned to a hardware component of the DAS 100.

Referring to FIG. 4, the signal set assignment user interface can include an available signals pane 402 that includes a representation of signals transported by the distributed antenna system that are available to be assigned to a signal set. For example, the available signals pane 402 displays four examples of available signals: 1.0.R1.1.1, 1.0.R1.1.2, 1.0.R1.2.1, and 1.0.R1.2.2. An assigned signals pane 416 can include a representation of signal sets transported by the distributed antenna system.

Figure 5:
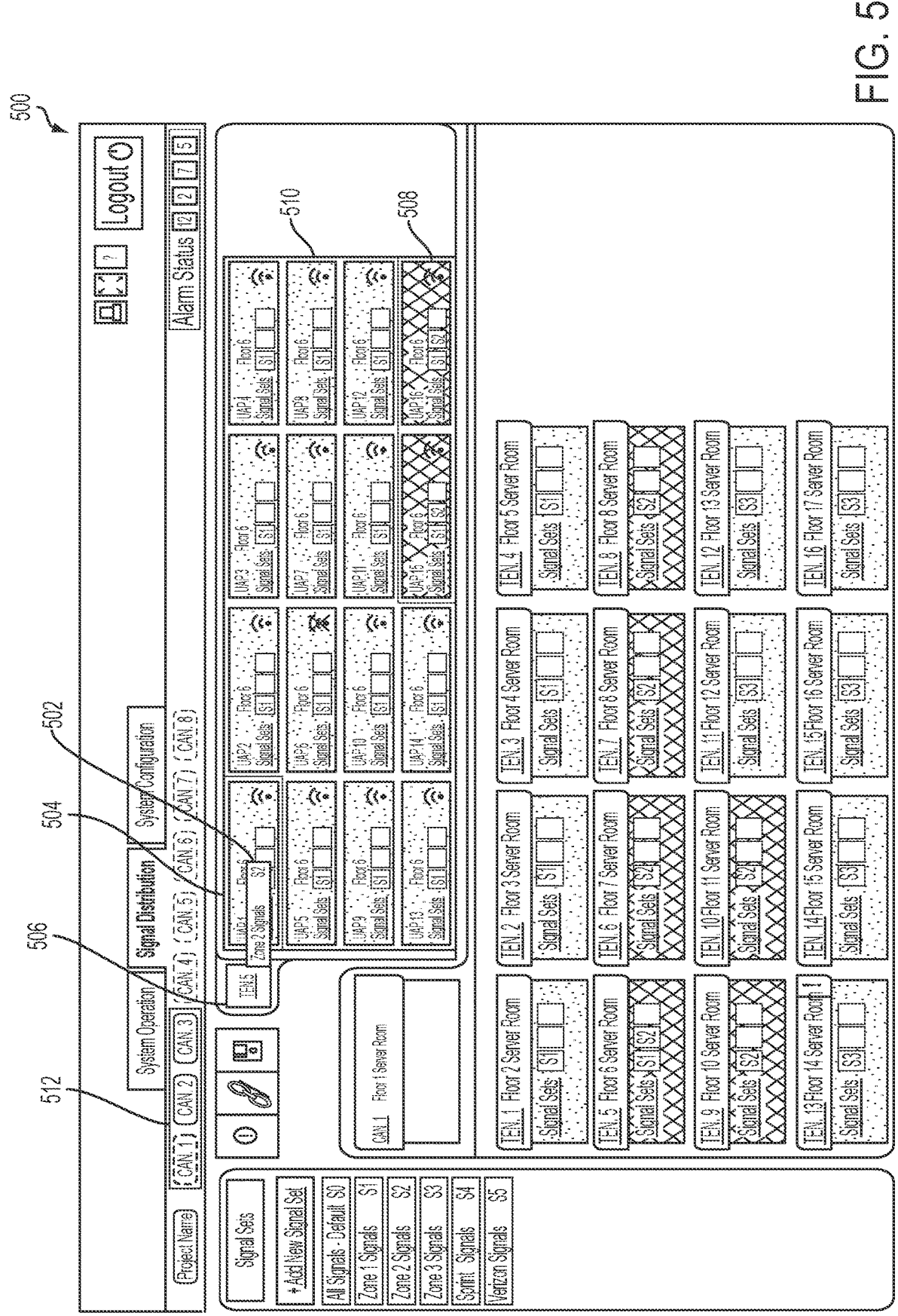
FIG. 5 depicts an example of a screen face of a signal distribution user interface for associating signal sets to DAS components according to one aspect of the present disclosure.

FIG. 5 is an example of a screen face 500 in which a signal set, S2, is being associated with UAP.1, which is associated with TEN.5. The signal set S2 can be associated with the UAP by a user dragging the representation 502 of the signal set to the representation 504 of the UAP listed at the top of the screen face 500 as being associated with TEN.5 506. As the representation 502 of signal set S2 is being dragged, representations 508 of some UAPs are highlighted a certain color (or another indicator) signifying that signal set S2 is already associated with the UAP, while representations 510 of other UAPs are highlighted with a different color (or other indicator) signifying that signal set S2 is not currently associated with the UAP. After the representation 502 of signal set S2 is dropped at the representation 504 of UAP.1 and the save icon is selected, the computing device 102 can output a command to the controller 132 to configure a path so that signals in signal set S2 are handled by UAP.1.

In other aspects, a signal set can be associated with a hardware component by left-clicking the representation of the hardware component to toggle the association of the signal set with that hardware component. A signal set can be associated with a TEN directly, which can cause the signal set to be associated with UAPs associated with that TEN. A signal set can be associated with a CAN directly, which can cause the signal set to be associated with TENs and UAPs associated with that CAN.

Figure 6:
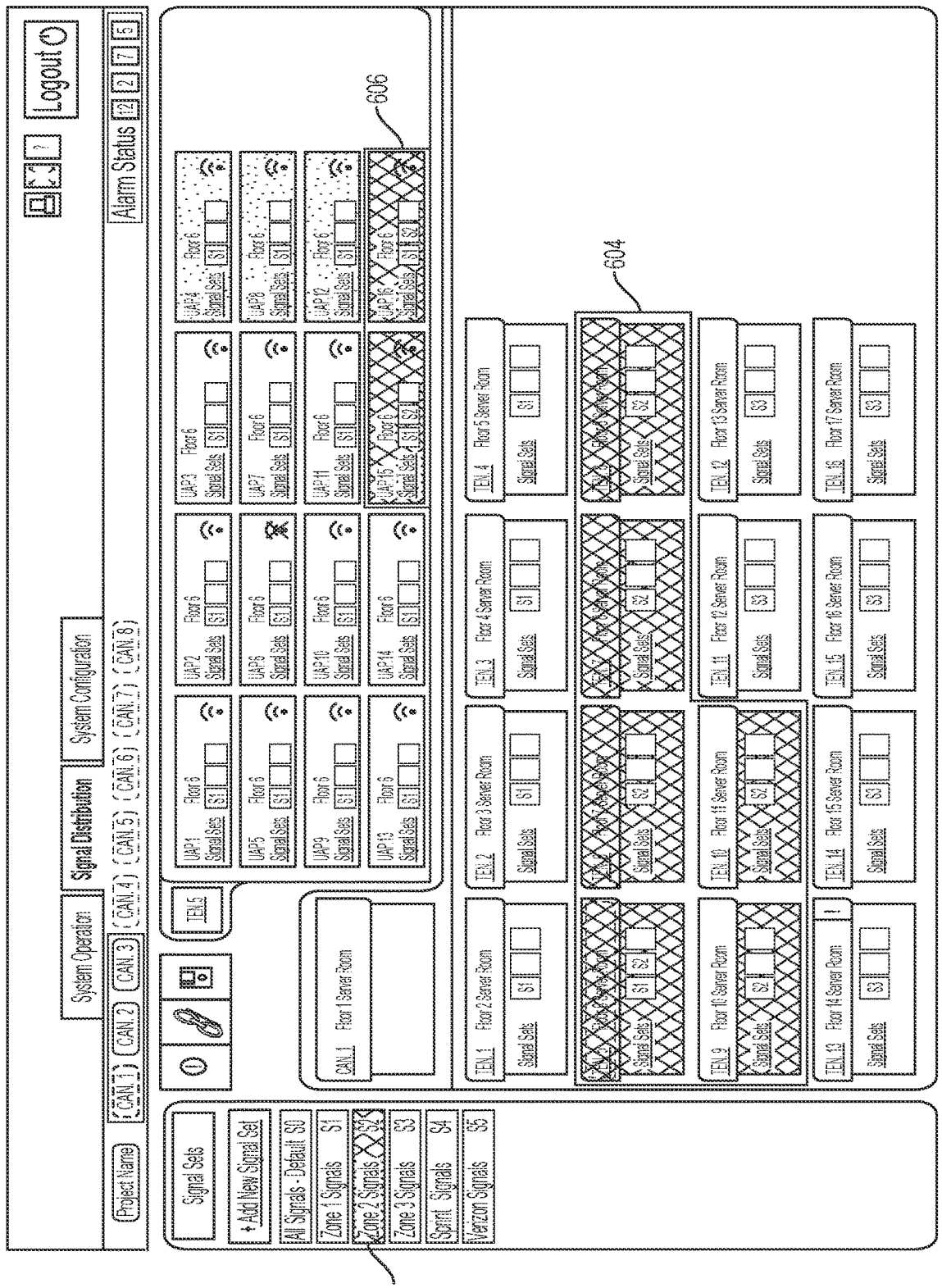
FIG. 6 depicts an example of a screen face of a signal distribution user interface for selecting a signal set and highlighting corresponding associations to DAS components according to one aspect of the present disclosure.

FIG. 6 depicts an example of a screen face in which signal set S2 is selected and, in response, the computing device causes the screen face to highlight the components (using a color or other indicator) of the hardware components (e.g., TENs and UAPs) with which the signal set is currently associated. For example, as shown in screen face 600, signal set S2 602 is selected causing UAP.15 and UAP.16 606 and TEN.5-TEN.10 604 to be highlighted, indicating the hardware components with which signal set S2 is currently associated.

Figure 7:
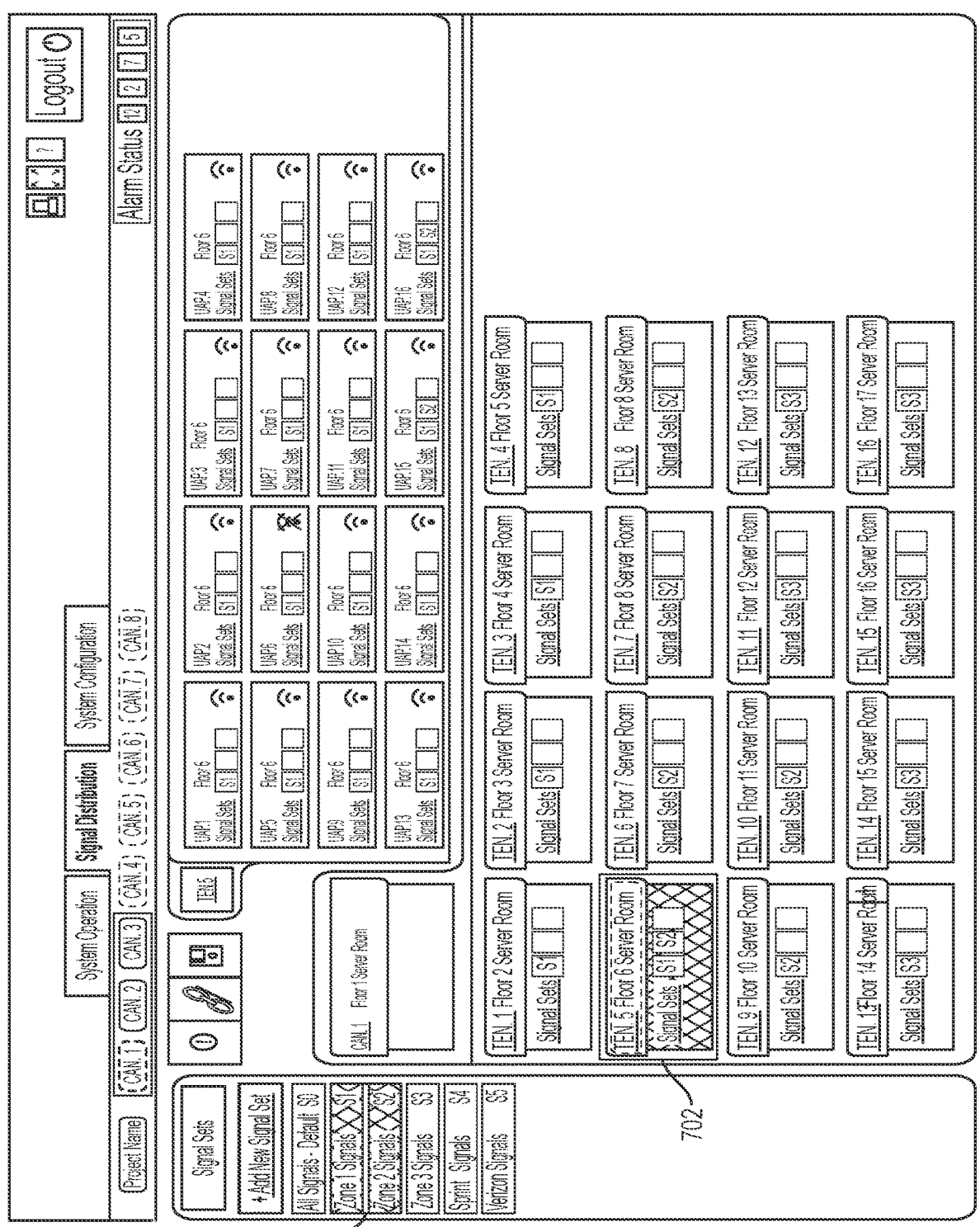
FIG. 7 depicts an example of a screen face of a signal distribution user interface for selecting a DAS component and highlighting corresponding associations to signal sets according to one aspect of the present disclosure.

FIG. 7 depicts an example of a screen face for selecting a hardware component (e.g., UAP, TEN, CAN) that highlights the associations that have been made with the selected hardware component to signal sets. For example, as shown in screen face 700, a hardware component, TEN.5, is selected as indicated by selection 702 and, in response, the computing device 102 highlights in the list of signal sets the signal sets currently associated with TEN.5, as indicated by selection 704.

Figure 8:
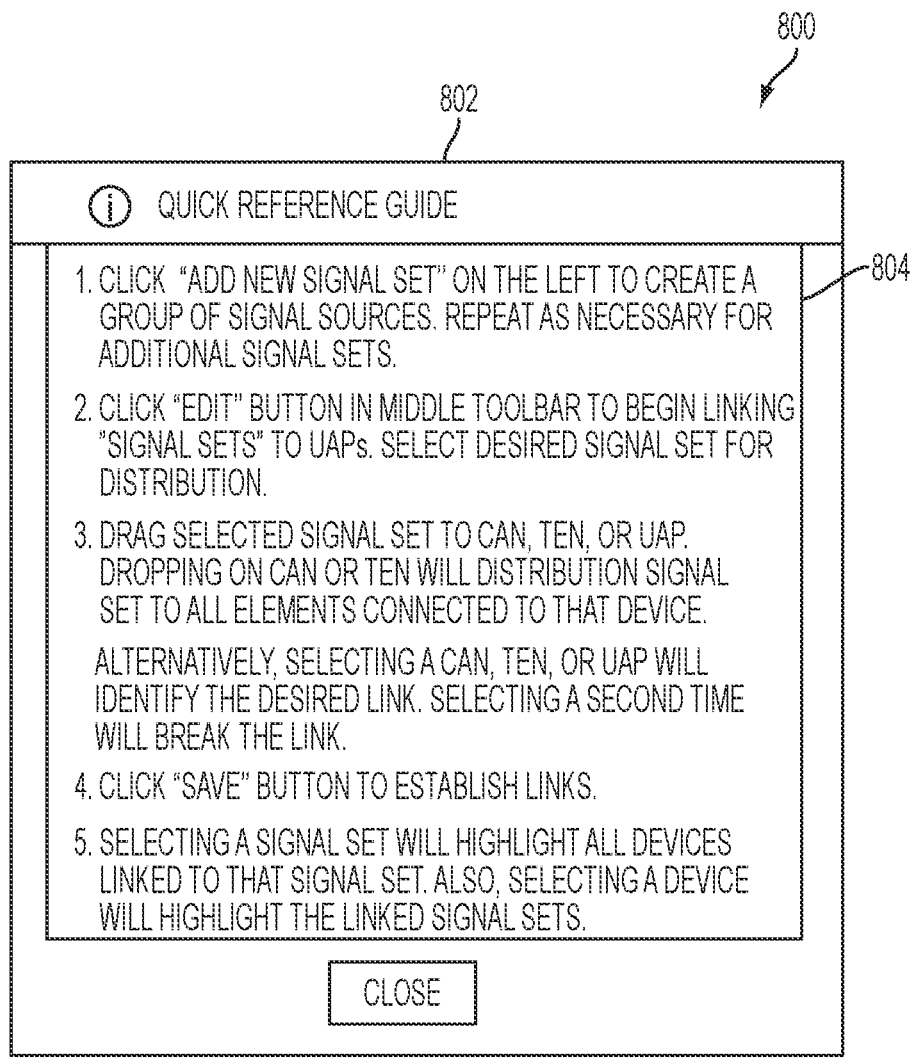
FIG. 8 depicts an example of a screen face of a quick reference i-link help guide according to one aspect of the present disclosure.

FIG. 8 shows an example of a quick reference guide screen face. The screen face 800 may be generated by the signal distribution engine 208 in response to a user selecting the "i-link" icon 324 on a screen face such as the example screen face 300 shown in FIG. 3. In response to a selection of the "i-link" icon 324, the signal distribution engine 208 can provide a quick reference guide 802 with information displayed in an information portion 804 including but not limited to, for example, adding a new signal set and associating signal sets with DAS components.

In some aspects, additional visual cues can be generated on the screen face to provide the user with information and selectable options. Setting up a system model for the user can depend on the context in which the GUI is operating. Typically, the DAS GUI may be in an operational context or a setup context. When in operational context, the user can view current events and alarms, signal status, and update the software, among other things. When in setup context, the user can take such actions as editing alarm settings, setting modem parameters, and associating signal sources with destinations. Visual cues can indicate context to the user. The GUI may also allow the user to change context as needed, so the widgets can allow for one or more actions. One such action is a mouse click.

Other visual cues that may be included in setting up the user system model include providing crumb trails to the user or widgets representing various aspects of the DAS. Crumb trails, or "breadcrumbs," may be used to indicate to the user how he or she arrived at a certain screen and allow him or her to go back to any previous step using a single action (i.e., click). Crumb trails may be displayed horizontally across the top of a screen face. Crumb trails may provide links back to each previous screen face the user navigated through to get to the current screen face or—in hierarchical user interface structures—the parent screen face of the current screen face. Crumb trails may provide a trail for the user to follow back to the starting or entry point. A greater-than sign (>), for example, may be used as a hierarchy separator, although other glyphs (such as >> or >) or graphical treatments may also be used. Crumb trails may include location- and attribute-type crumb trails. Location crumb trails may be static and display where the screen face is located in the hierarchy. Attribute crumb trails may provide information that categorizes the current screen face.

The visual cues may also include widgets or groupings of widgets. Widgets, or groups of widgets, may represent devices in the system either because they are well-known, look like the device in some way, and/or contain excellent labeling. Widgets may be grouped in a meaningful manner depending on the context in which the user is working. For example, when the user interface is operated in a setup context (e.g., during signal distribution definition), widgets indicating signal sources can be grouped together in one section of the screen while those indicating signal destinations can be grouped in another section.

Assisting the non-expert user so that appropriate user interactions with the system hardware can take place can depend on visual cues. Highlighting a widget or a set of widgets upon some action can prove helpful in many ways. For example, if the user has chosen to work in setup mode and clicks on a signal source widget, the GUI can highlight it and all widgets representing the receivers of the signal. So with a single action, the user can immediately learn the signal distribution from that single source. Another use of highlighting may be to alert the user that a device has a problem.

User assistance can also be given by providing high-level information about a device when the user hovers over a widget representing that device. User actions accepted by the device under the chosen context can be provided via a menu when the user takes some action, such as right-clicking.

In order for the user to retain a stable working model, placement of visual cues can depend on the overall GUI hierarchy. For example, information and actions that the user needs access to can be placed in the same location on every screen. Such placement may be at the outer edge of the screen, out of the "work" area.

For information and actions that are common across screens of the same context, visual cues can be placed in the same location on each of these screens for ease of locating the cues.

Actions that are allowed by the GUI may be either pointer operations or keyboard operations. Pointer operations can include mouse actions and touch actions. Each of these types of operation allow the user to do one or more of the following: left click, right click, double click, drag (i.e., to scroll), hover, drag and drop, select one or more widgets, zoom in, and zoom out.

Mouse operations may be accomplished using a mouse or by using the keyboard to mimic a mouse, referred to as mouse keys. Touch-sensitive screens can be used in many devices, including notebooks, kiosks, and mobile devices. Such devices can detect the presence and location of a touch or multiple touches through several means, among them: capacitive sensing and resistive sensing. Keyboard actions can allow the user to enter data while in setup context, tab through entries, and choose multiple items, etc. Other types of input devices, such as haptic-enabled devices can be used.

The components of the DAS 100 can be physically connected prior to user involvement via the GUI. If the components 102-130 are powered on, then the software in the various components 102-130 can determine information regarding the incoming signals that it detects, thus allowing the signal inputs to be automatically configured. Intervention on the part of the user may not be necessary to set up the system 100 in many cases. The incoming sources, however, may be associated with the necessary destinations for the signals to be propagated across the system as planned. This is a task that can be difficult to automate because too many assumptions may be made. This is a task typically requiring user configuration. By using a combination of visual cues and user action support, it may be possible to provide a simple, intuitive tool that will allow the user who is not an expert user to successfully complete this task in a few easy steps.

Associations may be made via drag and drop operations or by a guided, set of steps using the methods discussed above.

Figure 9:
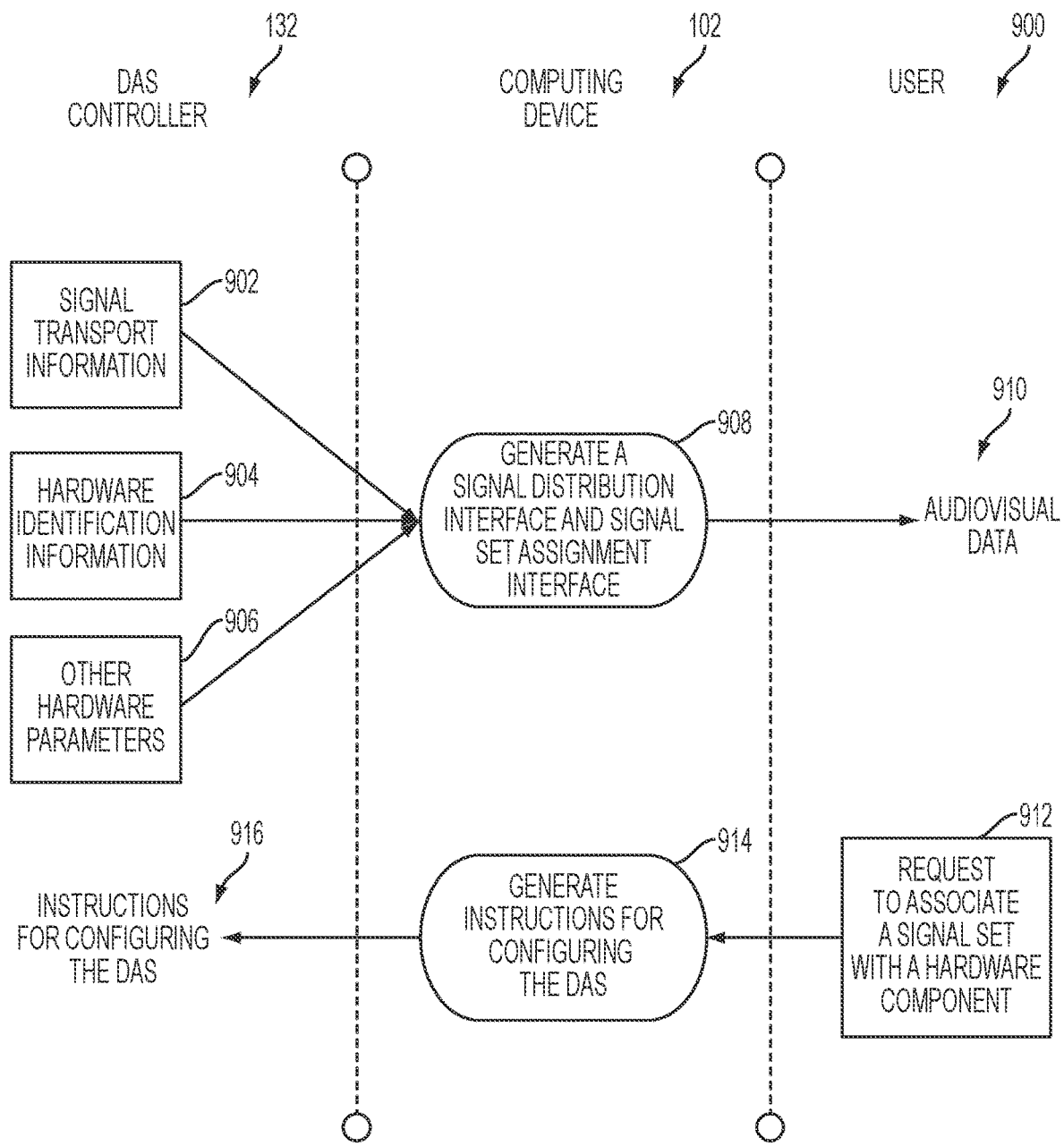
FIG. 9 depicts a process flow diagram for configuring a DAS according to one aspect of the present disclosure.

FIG. 9 depicts a process flow diagram for configuring the DAS based on the user instructions according to one aspect of the present disclosure. Signal transport information 902, hardware identification information 904, and other information or parameters of the DAS 906 may be sent from the DAS controller 132 to the computing device 102. The computing device 102 may use the signal transport information 902, the hardware identification information 904, and other information 906 to generate a signal distribution interface and a signal set assignment user interface at process 908.

As described above, the signal distribution interface may include displaying or otherwise presenting to the user 900 a first grouping of one or more widgets, where each widget represents a headend component, such as a CAN, of the DAS. A second grouping of one or more widgets representing one or more remote units in the DAS that are associated with a headend component of the first grouping. The signal distribution interface may also include a list of signal sets representing groups of signals to be transported in the DAS. A general alarm indicator representing an alarm status for all hardware components in the DAS may also be provided. Individual alarm indicators representing an alarm status for individual hardware components or groups of hardware components in the DAS may be provided in addition to the general alarm indicator. The signal distribution interface may also include tabs for switching between user contexts, such as an operational context whereby the user can view events and alarms, view signal status, or update software and a setup context whereby the user can edit alarm settings, set hardware component parameters, or associate signal sources with hardware components. The signal distribution interface may also include crumb trails for indicating a location or attribute of a currently displayed screen face.

The signal set assignment user interface may include a list of signals transported by a DAS and a list of editable signal sets. Each signal set includes one or more of the signals that are transported by the DAS. Signals can be assigned to a signal set by various user interface means. For example, a signal can be dragged and dropped onto a desired signal set or can be selected and a separate button may be activated in order to associate the signal with a signal set.

The computing device may output the signal distribution interface and the signal set assignment interface as audio-visual data for display on a computer at process 910. The computer may include a variety of input/output means for receiving mouse actions or touch actions such as single-clicking, double-clicking, click-holding, click-releasing, single finger touch, and multi-finger touch.

At process 912, the user 900 may initiate a request to associate a signal set with a hardware component via the signal distribution interface. For example, as described above with respect to FIG. 5, the signal set S2 can be associated with the UAP.1 by a user dragging the representation 502 of the signal set to the representation 504 of the UAP listed at the top of the screen face 500.

In response to receiving the request 912, the computing device 102 may generate instructions, at process 914, for configuring the DAS controller 132 to provide the signals in the signal set identified by the request 912 to the hardware component also identified by the request 912. For example, the computing device 102 may configure the DAS controller 132 to route signals associated with the signal set S2 to the hardware component UAP.1. The instructions generated at process 914 may be provided at process 916 to the DAS controller 132 for execution.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. The illustrative examples described above are given to introduce the reader to the general subject matter discussed here and are not intended to limit the scope of the disclosed concepts.

What is claimed is:

1. A telecommunications system, comprising:
 a processor device; and
 a non-transitory computer-readable medium on which a signal distribution engine is stored, wherein the signal distribution engine is executable by the processor device to:
  detect incoming signals received by a distributed antenna system (DAS) from one or more base stations, wherein the DAS includes a headend unit and one or more remote antenna units, wherein the headend unit is communicatively coupled to the one or more remote antenna units using a communication cable or optical fiber;

determine information about the detected incoming signals received by the DAS from the one or more base stations;

assign specified signals received by the DAS to a specified remote antenna unit in response to a user input via a signal distribution graphical user interface that manually associates the specified signals with the specified remote antenna unit, wherein the signal distribution graphical user interface includes representations of the specified signals, the headend unit, and the one or more remote antenna units, wherein the signal distribution graphical user interface includes associations between the specified signals, the headend unit, and the one or more remote antenna units;

in response to the user input via the signal distribution graphical user interface that manually associates the specified signals with the specified remote antenna unit, output instructions regarding how to configure one or more components of the DAS to route the specified signals from the headend unit to the specified remote antenna unit over a communication cable or optical fiber communicatively coupled to the specified remote antenna unit; and generate a signal set assignment graphical user interface that includes an available signals area having a list of available signals transported by the DAS that are available to be assigned to a particular signal set and a signal set formation area having a list of assigned signals transported by the DAS that are assigned to the particular signal set.

2. The telecommunications system of claim 1, wherein the signal distribution engine is executable by the processor device to generate an indicator of an alarm condition.

3. The telecommunications system of claim 1, wherein the signal distribution engine is executable by the processor device to highlight the representations of the headend unit and/or one or more remote antenna units with which a specified signal set is currently associated in response to receiving a user input via the signal distribution graphical user interface to select the specified signal set.

4. The telecommunications system of claim 1, wherein the signal distribution engine is executable by the processor device to:

highlight representations of signals with which the headend unit is currently associated in response to receiving a user input via the signal distribution graphical user interface to select the headend unit of the telecommunications system; and/or highlight representations of signals with which a respective remote antenna unit is currently associated in response to receiving a user input via the signal distribution graphical user interface to select the respective remote antenna unit of the telecommunications system.

5. The telecommunications system of claim 1, wherein the signal distribution engine is executable by the processor device to:

assign specified signals transported by the DAS to assigned signal sets in response to a user input via the signal set assignment graphical user interface that manually adds available signals to the signal set formation area to associate the specified signals with the specified remote antenna unit, wherein each of the assigned signal sets includes one or more of the signals that are transported by the DAS.

6. The telecommunications system of claim 1, wherein the signal distribution graphical user interface includes:

an operational context in which events and alarms are viewable, signal status is viewable, or options for updating software are viewable; and a setup context in which alarm settings are editable, hardware component parameters are received, or signal sources are associated with hardware components.

7. A method, comprising:

detecting incoming signals received by a distributed antenna system (DAS) from one or more base stations, wherein the DAS includes a headend unit and one or more remote antenna units, wherein the headend unit is communicatively coupled to the one or more remote antenna units using a communication cable or optical fiber;

determining information about the detected incoming signals received by the DAS from the one or more base stations;

assigning specified signals received by the DAS to a specified remote antenna unit in response to a user input via a signal distribution graphical user interface that manually associates the specified signals with the specified remote antenna unit, wherein the signal distribution graphical user interface includes representations of the specified signals, the headend unit, and the one or more remote antenna units, wherein the signal distribution graphical user interface includes associations between the specified signals, the headend unit, and the one or more remote antenna units; and in response to the user input via the signal distribution graphical user interface that manually associates the specified signals with the specified remote antenna unit, outputting instructions regarding how to configure one or more components of the DAS to route the specified signals from the headend unit to the specified remote antenna unit over a communication cable or optical fiber communicatively coupled to the specified remote antenna unit; and generating a signal set assignment graphical user interface that includes an available signals area having a list of available signals transported by the DAS that are available to be assigned to a particular signal set and a signal set formation area having a list of assigned signals transported by the DAS that are assigned to the particular signal set.

8. The method of claim 7, further comprising providing an indicator of an alarm condition in the signal distribution graphical user interface.

9. The method of claim 7, further comprising highlighting the representations of the headend unit and/or one or more remote antenna units with which a specified signal set is currently associated in response to receiving a user input via the signal distribution graphical user interface to select the specified signal set.

10. The method of claim 7, further comprising:

highlighting representations of signals with which the headend unit is currently associated in response to receiving a user input via the signal distribution graphical user interface to select the headend unit of the distributed antenna system; and/or highlighting representations of signals with which a respective remote antenna unit is currently associated in response to receiving a user input via the signal distribution graphical user interface to select the respective remote antenna unit of the distributed antenna system.

11. The method of claim 7, further comprising:
assigning specified signals transported by the DAS to assigned signal sets in response to a user input via the signal set assignment graphical user interface that manually adds available signals to the signal set formation area to associate the specified signals with the specified remote antenna unit, wherein each of the assigned signal sets includes one or more of the signals that are transported by the DAS.

12. A system, comprising:
a distributed antenna system (DAS) including:
  a headend unit; and
  one or more remote antenna units located remotely from the headend unit and communicatively coupled to the headend unit using a communication cable or optical fiber;
a computing device including:
  a processor device communicatively coupled to the distributed antenna system; and
  a non-transitory computer-readable medium on which a signal distribution engine is stored, wherein the signal distribution engine is executable by the processor device to:
  detect incoming signals received by the DAS from one or more base stations;
  determine information about the detected incoming signals received by the DAS from the one or more base stations;
  assign specified signals received by the DAS to a specified remote antenna unit in response to a user input via a signal distribution graphical user interface that manually associates the specified signals with the specified remote antenna unit, wherein the signal distribution graphical user interface includes representations of the specified signals, the headend unit, and the one or more remote antenna units, wherein the signal distribution graphical user interface includes associations between the specified signals, the headend unit, and the one or more remote antenna units; and
  in response to the user input via the signal distribution graphical user interface that manually associates the specified signals with the specified remote antenna unit, output instructions regarding how to configure one or more components of the DAS to route the specified signals from the headend unit to the specified remote antenna unit over a communication cable or optical fiber communicatively coupled to the specified remote antenna unit; and
  generate a signal set assignment graphical user interface that includes an available signals area having a list of available signals transported by the DAS that are available to be assigned to a particular signal set and a signal set formation area having a list of assigned signals transported by the DAS that are assigned to the particular signal set.

13. The system of claim 12, wherein the signal distribution engine is executable by the processor device to generate an indicator of an alarm condition.

14. The system of claim 12, wherein the signal distribution engine is executable by the processor device to highlight the representations of the headend unit and/or one or more remote antenna units with which a specified signal set is currently associated in response to receiving a user input via the signal distribution graphical user interface to select the specified signal set.

15. The system of claim 12, wherein the signal distribution engine is executable by the processor device to:
highlight representations of signals with which the headend unit is currently associated in response to receiving a user input via the signal distribution graphical user interface to select the headend unit of the distributed antenna system; and/or
highlight representations of signals with which a respective remote antenna unit is currently associated in response to receiving a user input via the signal distribution graphical user interface to select the respective remote antenna unit of the distributed antenna system.

16. The system of claim 12, wherein the signal distribution engine is executable by the processor device to:
assign specified signals transported by the DAS to assigned signal sets in response to a user input via the signal set assignment graphical user interface that manually adds available signals to the signal set formation area to associate the specified signals with the specified remote antenna unit, wherein each of the assigned signal sets includes one or more of the signals that are transported by the DAS.

17. A telecommunications system, comprising:
a processor device; and
a non-transitory computer-readable medium on which a signal distribution engine is stored, wherein the signal distribution engine is executable by the processor device to:
  configure incoming signals received by a distributed antenna system (DAS) from one or more base stations, wherein the DAS includes a headend unit and one or more remote antenna units, wherein the headend unit is communicatively coupled to the one or more remote antenna units using a communication cable or optical fiber;
  determine information about the incoming signals received by the DAS from the one or more base stations
  assign specified configured signals to a specified remote antenna unit in response to a user input via a signal distribution graphical user interface that manually associates the specified configured signals with the specified remote antenna unit, wherein the signal distribution graphical user interface includes representations of the specified configured signals, the headend unit, and the one or more remote antenna units, wherein the signal distribution graphical user interface includes associations between the specified configured signals, the headend unit, and the one or more remote antenna units; and
  in response to the user input via the signal distribution graphical user interface that manually associates the specified configured signals with the specified remote antenna unit, output instructions regarding how to configure one or more components of the DAS to route the specified configured signals from the headend unit to the specified remote antenna unit over a communication cable or optical fiber communicatively coupled to the specified remote antenna unit; and
  generate a signal set assignment graphical user interface that includes an available signals area having a list of available signals transported by the DAS that are available to be assigned to a particular signal set and a signal set formation area having a list of assigned signals transported by the DAS that are assigned to the particular signal set.

18. A method, comprising:

configuring incoming signals received by a distributed antenna system (DAS) from one or more base stations, wherein the DAS includes a headend unit and one or more remote antenna units, wherein the headend unit is communicatively coupled to the one or more remote antenna units using a communication cable or optical fiber;

determining information about the incoming signals received by the DAS from the one or more base stations;

assigning specified configured signals to a specified remote antenna unit in response to a user input via a signal distribution graphical user interface that manually associates the specified configured signals with the specified remote antenna unit, wherein the signal distribution graphical user interface includes representations of the specified configured signals, the headend unit, and the one or more remote antenna units, wherein the signal distribution graphical user interface includes associations between the specified configured signals, the headend unit, and the one or more remote antenna units; and in response to the user input via the signal distribution graphical user interface that manually associates the specified configured signals with the specified remote antenna unit, outputting instructions regarding how to configure one or more components of the DAS to route the specified configured signals from the headend unit to the specified remote antenna unit over a communication cable or optical fiber communicatively coupled to the specified remote antenna unit; and generating a signal set assignment graphical user interface that includes an available signals area having a list of available signals transported by the DAS that are available to be assigned to a particular signal set and a signal set formation area having a list of assigned signals transported by the DAS that are assigned to the particular signal set.

\* \* \* \* \*